United States Patent
Reimers et al.

(10) Patent No.: US 11,384,174 B2
(45) Date of Patent: Jul. 12, 2022

(54) DETECTION OF POLYMER CONCENTRATION IN POLYMERIZATION PROCESS USING REFRACTIVE INDEX MEASUREMENT

(71) Applicant: ExxonMobil Chemical Patents Inc., Baytown, TX (US)

(72) Inventors: Jay L. Reimers, Houston, TX (US); Yifeng Hong, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/847,744

(22) Filed: Apr. 14, 2020

(65) Prior Publication Data

US 2020/0362063 A1    Nov. 19, 2020

Related U.S. Application Data

(60) Provisional application No. 62/848,052, filed on May 15, 2019.

(51) Int. Cl.
*C08F 10/00* (2006.01)
*G01N 21/41* (2006.01)
(Continued)

(52) U.S. Cl.
CPC ............... *C08F 10/00* (2013.01); *B01J 19/18* (2013.01); *B01J 19/2435* (2013.01); *G01N 21/4133* (2013.01)

(58) Field of Classification Search
USPC .............................. 356/128; 526/60; 528/501
See application file for complete search history.

(56) References Cited

U.S. PATENT DOCUMENTS

| | | | | |
|---|---|---|---|---|
| 2,769,804 A | * | 11/1956 | Hanson | B01J 19/20 526/65 |
| 3,256,262 A | * | 6/1966 | Irvin | C08F 2/00 526/60 |

FOREIGN PATENT DOCUMENTS

| | | |
|---|---|---|
| GB | 858549 | 1/1961 |
| GB | 863650 | 3/1961 |
| WO | 98/29787 | 7/1998 |

OTHER PUBLICATIONS

Falciai, etal, "Optical fiber long-period gratings for the refractometry of aqueous solutions," Proc. SPIE 3555, Optical and Fiber Optic Sensor Systems (Aug. 13, 1998); https://doi.org/10.1117/12.318215 (Year: 1998).*

(Continued)

*Primary Examiner* — Fred M Teskin

(57) ABSTRACT

A method for determining polymer concentration can include synthesizing a polymer in a reactor under a set of parameters, wherein the reactor comprises a solution mixture having a refractive index, and wherein the solution mixture comprises a solvent, a polymer, and optionally a monomer, wherein the solution mixture has a polymer concentration; measuring the refractive index of the solution mixture; comparing the refractive index of the solution mixture with a calibration curve; and identifying the polymer concentration in the solution mixture. A system for determining polymer concentration can include a reactor containing a solution mixture comprising a solvent, a polymer, and optionally a monomer; a flash vessel fluidly coupled to the reactor to receive the solution mixture from the reactor; and a first refractometer fluidly coupled to the reactor, placed between the reactor and the flash vessel, and configured to measure a refractive index of the solution mixture.

20 Claims, 4 Drawing Sheets

(51) Int. Cl.
    *B01J 19/18*          (2006.01)
    *B01J 19/24*          (2006.01)

(56)          References Cited

OTHER PUBLICATIONS

Aloui, et al, "Photopolymerization of an Epoxy Resin: Conversion and Temperature Dependence of its Refractive Index," Macromol. Chem. Phys. 2016, 217, 2063-2067. (Year: 2016).*
Gross et al., "Perturbed-Chain SAFT: An Equation of State Based on a Perturbation Theory for Chain Molecules", Ind. Eng. Chem. Res., 2001, vol. 40, pp. 1244-1260.
Karssenberg et al., "Terminal and Penultimate Reactivity Ratios in Single-Site Ethene/Propene Copolymerizations: Comparison of Kakugo and Direct Peak Methods", Macromolecular Chemistry and Physics, 2005, vol. 206, pp. 1675-1683.
Matos et al., "Method for Quantitative Evaluation of Kinetic Constants in Olefin Polymerizations, 3—Kinetic Study of the hiPP Synthesis", Macromolecular Reaction Engineering, 2007, vol. 1, pp. 137-159.
Young et al., "Kinetic Modeling of Ethylene-Norbornene Copolymerization Using Homogenous Metallocene Catalysis", Macromolecules, 2003, vol. 36, pp. 4216-4225.
Young et al., "Polymerization kinetics and modeling of a metalloceene cyclic olefin copolymer system", European Polymer Journal, vol. 39, (2003), pp. 165-171.

* cited by examiner

DETECTION OF POLYMER CONCENTRATION IN POLYMERIZATION PROCESS USING REFRACTIVE INDEX MEASUREMENT

CROSS-REFERENCE TO RELATED APPLICATIONS

This application claims priority to U.S. Ser. No. 62/848,052, filed May 15, 2019, herein incorporated by reference.

BACKGROUND

The present disclosure relates to methods and systems for monitoring polymerization processes.

Solution polymerization is one of many methods by which polymerization can be performed on an industrial scale. In solution polymerization processes, monomers are reacted with catalysts in the presence of a solvent, typically a solvent that does not react with the catalysts or monomers. The monomers and polymers resulting from the polymerization reaction are solubilized in a reactor by a solvent. The solution is then transferred from the reactor for further processing. Typically, the solvent and unreacted monomers are first flashed off (or volatilized) to separate the solvent and unreacted monomers from the polymers in concentration and devolatilization stages. Then, the polymers are extruded and pelletized to form small pellets, which are dried and bagged.

The polymer concentration in the solution that leaves the reactor impacts the design and control of the polymerization process. For example, if the polymer concentration is too low in the effluent exiting from the reactor, the excessive amount of solvent can potentially overwhelm the downstream devolatilization units. Accordingly, determining the polymer concentration during the solution polymerization process after the solution has left the reactor has value to operators of solution polymerization systems.

Currently, a number of techniques have been developed to measure the polymer concentration in the solution leaving the reactor including ultraviolet-visible (UV-vis) spectroscopy, density correlation, and rheological measurement. The UV-vis spectroscopy technique determines the concentration of polymer in the solution by measuring the light absorption in the ultraviolet-visible spectral region. While UV-vis spectroscopy itself is a simple and quick method, this spectroscopy technique is limited to only polymers containing a moiety that have an absorption band in the ultraviolet-visible spectral region. Further, obtaining accurate concentration measurements from UV-vis spectroscopy often requires a dilute solution of the polymer. Accordingly, applying UV-vis spectroscopy for in-line measurement of polymer concentration in a solution polymerization process is limited in scope and burdened by additional sample handling.

The density correlation method correlates the concentration of polymers in a solution with the density of the solution. Density of a solution can be accurately measured by a density detector. However, a drawback of the density detector is that the flow behavior of the solution is required to be within the range of Newtonian behavior. Because the polymer solution in a solution polymerization process is usually non-Newtonian, the density correlation method is not suitable.

The polymer concentration in the solution can also be determined by correlating the viscosity of polymer solution with the polymer concentration. The viscosity of the polymer solution can be determined using an inline viscometer implemented in a pipe that contains the polymer solution downstream of the reactor. However, inline viscometers are not typically designed to operate at high temperatures and pressures, which are often the conditions of solution polymerization processes. Accordingly, viscosity measurement performed at high temperatures and pressures with the inline viscometer can be inaccurate. Such inaccuracy is then transposed to the correlated polymer concentration and the design and control of the polymerization process.

Therefore, an appropriate detection of polymer concentration that is simple, accurate, non-invasive, and has real-time response at the conditions of the solution polymerization processes is highly desirable.

SUMMARY OF THE INVENTION

This application relates generally to methods and systems for determining polymer concentration in the solution polymerization process using refractive index detection.

A first example embodiment is a method comprising: synthesizing a polymer in a reactor under a set of parameters, wherein the reactor comprises a solution mixture having a refractive index, and wherein the solution mixture comprises a solvent, a polymer, and optionally a monomer, wherein the solution mixture has a polymer concentration; measuring the refractive index of the solution mixture; comparing the refractive index of the solution mixture with a calibration curve; and identifying the polymer concentration in the solution mixture.

Another example embodiment is a system comprising: a reactor containing a solution mixture comprising a solvent, a polymer, and optionally a monomer; a flash vessel fluidly coupled to the reactor to receive the solution mixture from the reactor; and a first refractometer fluidly coupled to the reactor, placed between the reactor and the flash vessel, and configured to measure a refractive index of the solution mixture.

BRIEF DESCRIPTION OF THE DRAWINGS

The following figures are included to illustrate certain aspects of the embodiments and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
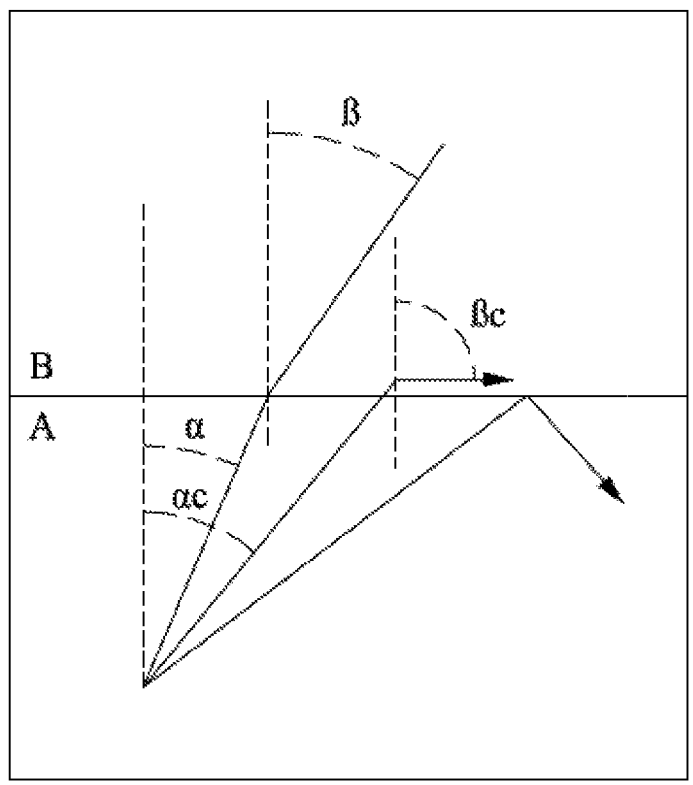
FIG. 1 is a schematic illustration of the mechanism by which the detection of refractive index changes in a polymer solution can be used to determine the polymer concentration.

The present disclosure relates to methods and systems for determining polymer concentration in a solution polymerization process using refractive index detection (e.g., using a refractometer). More specifically, the present disclosure provides accurate, non-invasive, and real-time methods and systems to determine polymer concentration in the solution polymerization process over a wide range of process conditions.

The refractive index detection methods and systems described herein are useful to determine the polymer concentration in the solution polymerization process, and more specifically, in the effluent from the reactor or at any point in processing the effluent.

The monomers, polymers, and solvents in solution polymerization processes can have very distinct refractive indexes. Accordingly, it is possible to differentiate between species.

Additionally, the refractive index detection is very accurate. The resolution of refractometer commercially available has a resolution of 0.00001. This resolution is sufficient to detect the change of polymer concentration because usually one percent of concentration corresponds to approximately 0.002 in refractive index of the solution. Moreover, the detected range of polymer concentration is theoretically from 0% to 100% as long as the difference of refractive index between prism and the sample medium is large enough, regardless of whether the flow is Newtonian or not.

Further, the refractive index detection is non-invasive. In comparison with the rheological method, which considerably increases pressure drop along the detector, a refractometer only contacts the solution with short and thin optical fibers, which has negligible impact over the flow. In addition, no certain functional groups or moieties are required to exist for the refractive index detection techniques as there is with UV-vis methods.

The refractive index detection can also be applied in a wide range of process conditions. Because the prism material is usually very durable, refractive index detection can be used in high pressure and high temperature environment which prohibits the usage of many other types of detectors.

Finally, the measurements can be taken in real-time, which is advantageous for monitoring and controlling the process. That is, the polymer concentration can be reported simultaneously by correlating the real-time refractive index of solution to the calibration curve. With polymer concentration monitored in real-time, changes to process parameters can be quickly made when needed.

Definitions

As used herein, a "polymer" may be used to refer to homopolymers, copolymers, interpolymers, terpolymers, etc. When a polymer is referred to as comprising a monomer, the monomer is present in the polymer in the polymerized form of the monomer or in the derivative form of the monomer. Thus, when a polymer is said to comprise a certain percentage (e.g., wt %) of a monomer, that percentage of monomer is based on the total amount of monomer units in all the polymer components of the composition or blend. That is, a polymer comprising 30 wt % ethylene and 70 wt % propylene is a polymer where 30 wt % of the polymer is ethylene-derived units and 70 wt % of the polymer is propylene-derived units.

As used herein, "solution polymerization" refers to a polymerization process that takes place in the presence of a liquid polymerization system, such as an inert solvent or monomer(s) or their blends, in which the produced polymer dissolves. Solution polymerization comprises a homogeneous liquid polymerization system in the reactor. The temperature of a liquid polymerization system is below its supercritical or pseudo supercritical temperature, thus, solution polymerizations are performed below the supercritical temperature and/or pressure of the system.

As used herein, the "polymer concentration" is a weight percent of polymer relative to the solution mixture total weight.

As used herein, a "solution mixture" or "mixture fluid" (sometimes referred to as reactor fluid), includes all reagents (such as monomers, initiators, catalysts, surfactants, natural and/or synthetic polymers, etc.), and any other supporting components or fluids (such as solvent or mixtures of solvents in which the reagents are dissolved or suspended, and components which control the characteristics of the reactive medium, such as temperature, pressure, viscosity, color, ionic strength, pH, concentration of the reagents, etc.).

As used herein, when describing components of a system that are fluidly coupled, the "fluid coupling" refers to fluids being able to travel from one component to the other or between components. When traversing a fluid coupling, the fluid may travel through hardware like lines, pipes, pumps, connectors, heat exchangers, and valves that ensure proper operation and safety measures when operating the system.

Detector measurements of the refractive index are made of the solution mixture after the reactor. Typically when a detector measurement is made, it means that at that time the signal from the detector is captured and stored by a computer.

Refractive Index

The refractive index of the solution is measured by the total internal reflection. The mechanism is illustrated in FIG. 1. In FIG. 1, the area labelled A represents the optically denser material and the area labelled B represents the less optically dense material. When a light travels towards the interface of two materials with an angle of α, the light will be refracted at the surface and continues to travel in the direction with an angle of β. The angle β can be calculated according to Eq. 1.

$$\sin\alpha = \frac{n_B}{n_A}\sin\beta \qquad \text{Eq. 1}$$

where $n_A$ and $n_B$ are the absolute refractive index of the media A and B.

When the angle α is increased, β reaches 90° at some point, and the bent light travels along the surface. If the angle α is further increased, the light cannot enter material B. Instead, the light reflects back to material A. This phenomenon is called total internal reflection. The angle $\alpha_C$ at which sin β=1 is called the critical angle of refraction and can be calculated according to Eq. 2. The refractometer measures the critical angle of refraction $\alpha_C$.

$$\sin\alpha_C = \frac{n_B}{n_A} \qquad \text{Eq. 2}$$
$$n_B = n_A \sin\alpha_C$$

According to an embodiment of the invention, material A is a measurement prism, and material B is the solution mixture. Because $n_A$ is the refractive index of measurement prism, which is a known constant, the refractive index $n_B$ of the sample can be easily calculated. Typically, the refractive index of the prism is much higher than that of the sample medium. For solution polymerization processes, the material of the prism should be selected to be chemically and mechanically durable because of the potential high pressure, high temperature, and erosive environment.

The concentration of solute in a solvent can be determined by measuring the refractive index $n_B$. The relation between the refractive index and the concentration depends on the solvent and solute, temperature, and wavelength. Wavelength-dependency (dispersion) may be avoided by using monochromatic light. The temperature dependency is eliminated by using a compensation formula.

For example, a propylene monomer has a refractive index of 1.36, a 2-methylpentane solvent has 1.371, an ethylene monomer has a refractive index of 1.35, a linear low density propylene ethylene copolymer has a refractive index of 1.51, and polypropylene has a refractive index of 1.49. As the polymer concentration increases and the monomer concentration decreases in the solution, the refractive index increases. The change in the refractive index can be recorded for known solution mixtures having known polymer and monomer concentrations to provide a calibration curve, which can then be used to correlate the change in measured refractive index of a solution mixture of unknown polymer concentration. Therefore, the polymer concentration can be determined by measuring the change of mixture refractive index and referring an index to a calibration curve.

Polymerization Process and Systems

The methods and systems of the present disclosure include a refractometer for measuring the refractive index of a solution comprising a polymer product of a solution polymerization reaction.

Figure 2:
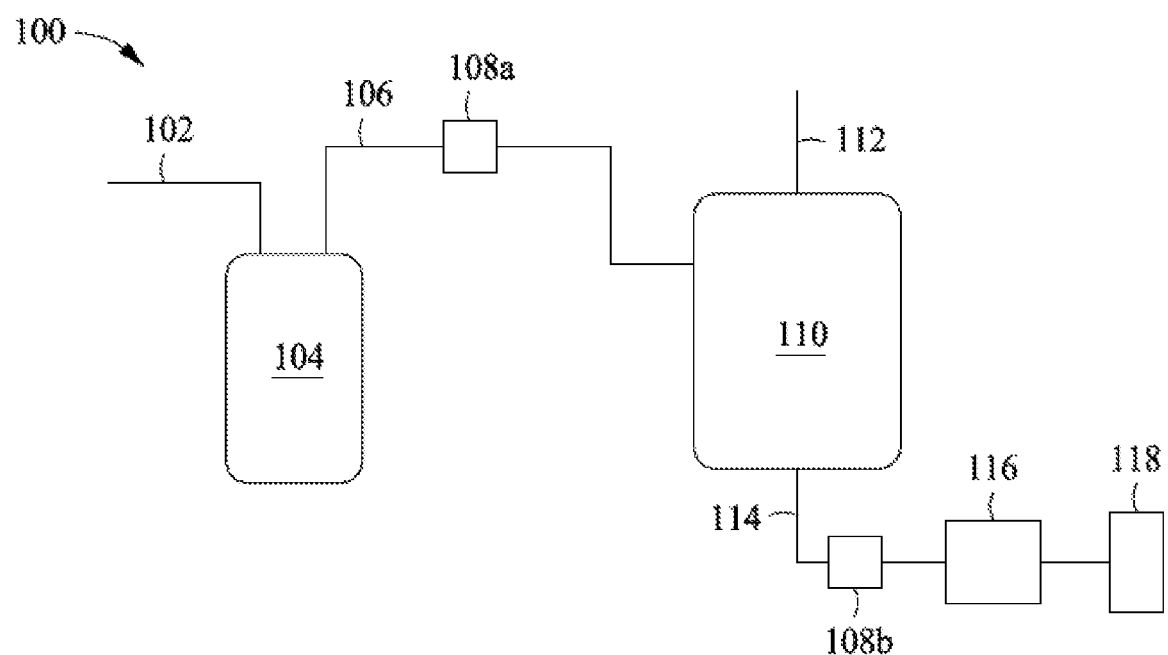
FIG. 2 illustrates a diagram of a system having a reactor for solution polymerization and a refractive index device placed after the reactor.

FIG. 2 illustrates a diagram of a system 100 of the present disclosure for monitoring the polymer concentration in a polymerization solution. A feedstock comprising a monomer and a solvent is introduced to a reactor 104 (e.g., a loop reactor or a stirred tank reactor) via a feedstock line 102. The feedstock can also comprise a catalyst. Alternatively (not illustrated), the catalyst can be introduced to the reactor 104 through another line. The monomer reacts with catalyst in the reactor to produce a polymer product that is solubilized by the solvent. A solution mixture is the effluent of the reactor. The effluent is conveyed to a flash vessel 110 via line 106.

In the flash vessel 110, the solvent and unreacted monomer are volatilized and removed as overheads via overheads line 112. The polymer-rich bottoms of the flash vessel 110 are conveyed to a devolatilization unit 116 and/or a finishing unit 118 via bottom line 114.

The system 100 further includes one or more refractometers 108 downstream of the reactor 104. As illustrated, there are two refractometer 108a and 108b. The first refractometer 108a is located along line 106 between the reactor 104 and the flash vessel 110. The second refractometer 108b is located along line 114 between the flash vessel 110 and the devolatilization unit 116 and/or the finishing unit 118. In alternative systems, only one of the two illustrated refractometers may be employed. In other alternative systems, two or more refractometers can be placed in one or both of these locations, which allows for redundancies.

Accordingly, a method of the present disclosure can comprise: synthesizing a polymer in a reactor 104 under a set of parameters, wherein the reactor 104 comprises a solution mixture having a refractive index, and wherein the solution mixture comprises a solvent, a polymer, and optionally a monomer, wherein the solution mixture has a polymer concentration; measuring the refractive index of the solution mixture; comparing the refractive index of the solution mixture with a calibration curve; and identifying the polymer concentration in the solution mixture. The method of the present disclosure can further comprise modifying the set of parameters based on the polymer concentration of the solution mixture. In the method of the present disclosure, the reactor 104 can be a loop reactor or a stirred tank reactor. The method of the present disclosure can further comprise a devolatilization step. In the method of the present disclosure, the refractive index is measured before the devolatilization step. The method of the present disclosure can further comprise a finishing step. In the method of the present disclosure, the refractive index can be measured before the finishing step. In the method of the present disclosure, the polymer can comprises a polyolefin. In the method of the present disclosure, the monomer can be selected from the group consisting of: ethylene, propylene, butene, pentene, hexene, heptene, octene, nonene, decene, dodecene, 4-methylpentene-1,3-methylpentene-1,3,5,5-trimethylhexene-1,5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. In the method of the present disclosure, the polymer concentration can be in a range from about 1 wt % to about 75 wt %.

Further, a system of the present disclosure can comprise: A system 100 comprising: a reactor 104 containing a solution mixture comprising a solvent, a polymer, and optionally a monomer; a flash vessel 110 fluidly coupled to the reactor 104 to receive the solution mixture from the reactor 104; and a first refractometer 108a fluidly coupled to the reactor, placed between the reactor 104 and the flash vessel 110, and configured to measure a refractive index of the solution mixture. In the system 100 of the present disclosure, the reactor 104 can be a loop reactor or a stirred tank reactor. The system 100 of the present disclosure can further comprise a devolatilization unit 116. The system 100 of the present disclosure can further comprise a finishing unit 118. The system 100 of the present disclosure can further comprise a second refractometer 108b placed between the flash vessel 110 and the devolatilization unit 116 and/or between the flash vessel 110 and the finishing unit 118. In the system 100 of the present disclosure, the polymer can comprise a polyolefin. In the system 100 of the present disclosure, the monomer can be selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene. In the system of the present disclosure, the polymer concentration can be in a range from about 1 wt % to about 75 wt %.

The solution polymerization process described herein may be carried out in any manner known in the art. The process may comprise polymerizing one or more monomers dissolved in a solvent as described herein in the presence of a catalyst system under conditions to obtain a first effluent comprising a solution of polyolefin and solvent and/or unreacted monomer. The reactor effluent, which is a concentrated polymer solution, with a polymer weight fraction ranging from about 1 wt % to about 75 wt %, or more preferably from about 2 wt % to about 50 wt %, flows to the polymer concentration stage in a flash vessel or flash unit, in which the majority of unreacted monomers, comonomers and solvent are separated from the polymers. The polymer concentration stage can be accomplished by various methods, for example, vapor-liquid separation, liquid-liquid separation, or both. This stage can contain one or more separation vessels. A further devolatilization step will remove the residual volatiles from the polymers to reach the volatile requirement. In most cases, vacuum and continuous surface area renewal are used. The finishing step will pelletize the polymers into pellets suitable for shipping.

The polymerization process may be conducted under conditions including a temperature of about 50° C. to about 220° C., preferably about 70° C. to about 210° C., preferably about 90° C. to about 200° C., preferably from 100° C. to 190° C., preferably from 130° C. to 160° C. The polymerization process may be conducted at a pressure of from about 120 psi to about 1800 psi (about 12,411 kPa), preferably from 200 psi to 1000 psi (about 1379 kPa to 6895 kPa), preferably from 300 psi to 600 psi (about 2068 kPa to 4137 kPa). Preferably, the pressure is about 450 psi (about 3103 kPa).

Hydrogen may be present during the polymerization process at a partial pressure of 0.001 psig to 50 psig (0.007 kPa to 345 kPa), preferably from 0.01 psig to 25 psig (0.07 kPa to 172 kPa), more preferably 0.1 psig to 10 psig (0.7 kPa to 70 kPa).

Catalyst System

Catalyst systems suitable for use in conjunction with the methods and systems of the present invention can preferably comprise metallocene catalysts and other single site catalysts because these catalysts generally produce polymers with narrow molecular weight distribution. The PDI values for polymers made with metallocene catalyst systems in homogeneous polymerization media are typically close to the statistically expected value of 2.0. However, any polymerization catalyst capable of polymerizing the monomers disclosed can be used if the catalyst is sufficiently active under the polymerization conditions disclosed herein. Thus, Group-3-10 transition metals can form suitable polymerization catalysts. A suitable olefin polymerization catalyst will be able to coordinate to, or otherwise associate with, an alkenyl unsaturation. Examples of olefin polymerization catalysts can include, but are not limited to, Ziegler-Natta catalyst compounds, metallocene catalyst compounds, late transition metal catalyst compounds, and other non-metallocene catalyst compounds.

As disclosed herein, Ziegler-Natta catalysts are those referred to as first, second, third, fourth, and fifth generation catalysts in the Propylene Handbook, E. P. Moore, Jr., Ed., Hanser, N.Y., 1996. Metallocene catalysts in the same reference are described as sixth generation catalysts. One exemplary non-metallocene catalyst compound comprises non-metallocene metal-centered, heteroaryl ligand catalyst compounds (where the metal is chosen from the Group 4, 5, 6, the lanthanide series, or the actinide series of the Periodic Table of the Elements).

Just as in the case of metallocene catalysts, these non-metallocene metal-centered, heteroaryl ligand catalyst compounds are typically made fresh by mixing a catalyst precursor compound with one or more activators. Non-metallocene metal-centered, heteroaryl ligand catalyst compounds are described in detail in PCT Patent Publications Nos. WO 02/38628, WO 03/040095 (pages 21 to 51), WO 03/040201 (pages 31 to 65), WO 03/040233 (pages 23 to 52), WO 03/040442 (pages 21 to 54), WO 2006/38628, and U.S. Patent Application Publication No. 2008/0153997, each of which is herein incorporated by reference.

Activators and associated activation methods can be used in a catalyst system. Examples of activators include, but are not limited to, aluminoxane and aluminum alkyl activators, ionizing activators, and nonionizing activators.

Examples of aluminoxane and aluminum alkyl activators and associated methods can be found in U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, and 5,103,031; European Patent and Application Publication Nos. EP 0 561 476 A1, EP 0 279 586 B1, EP 0 516 476 A, and EP 0 594 218 A1; and PCT Patent Publications No. WO 94/10180, which are each incorporated herein by reference.

Examples of ionizing activators and associated methods can be found in European Patent and Application Publication Nos. EP 0 570 982 A, EP 0 520 732 A, EP 0 495 375 A, EP 0 500 944 B1, EP 0 277 003 A and EP 0 277 004 A; and U.S. Pat. Nos. 5,153,157, 5,198,401, 5,066,741, 5,206, 197, 5,241,025, 5,384,299, and 5,502,124.

Examples of nonionizing activators and associated methods can be found in E. Y.-X. Chen and T. J. Marks, "Cocatalysts for Metal-Catalyzed Olefin Polymerization: Activators, Activation Processes, and Structure-Activity Relationships", Chem. Rev., 100, 1391-1434 (2000).

Monomers

Any monomer having one or more non-conjugated aliphatic double bond(s) and two or more carbon atoms may be used. Examples of monomers include, but are not limited to, α-olefins (e.g., ethylene, propylene, butene-1, hexene-1, octene-1, decene-1, and dodecene-1), substituted olefins (e.g., styrene, paramethylstyrene, and vinylcyclohexane), non-conjugated dienes (e.g., vinylcyclohexene), α,ω-dienes (e.g., 1,5-hexadiene and 1,7-octadiene), cycloolefins (e.g., cyclopentene, cyclohexene, and cyclohexadiene), norbornene, and the like, and any combination thereof.

Olefin monomer or monomers can be used. Advantageous monomers include $C_2$ to $C_{100}$ olefins, advantageously $C_2$ to $C_{60}$ olefins, advantageously $C_3$ to $C_{40}$ olefins advantageously $C_3$ to $C_{20}$ olefins, advantageously $C_3$ to $C_{12}$ olefins. Monomers can include linear, branched or cyclic alpha-olefins, advantageously $C_3$ to $C_{100}$ alpha-olefins, advantageously $C_3$ to $C_{60}$ alpha-olefins, advantageously $C_3$ to $C_{40}$ alpha-olefins advantageously $C_3$ to $C_{20}$ alpha-olefins, advantageously $C_3$ to $C_{12}$ alpha-olefins. Advantageous olefin monomers can be one or more of ethylene, propylene, butene, pentene, hexene, heptene, octene, nonene, decene, dodecene, 4-methylpentene-1,3-methylpentene-1,3,5,5-trimethylhexene-1, and 5-ethylnonene-1.

Aromatic-group-containing monomers containing up to 30 carbon atoms can be used. Suitable aromatic-group-containing monomers comprise at least one aromatic structure, advantageously from one to three, more advantageously a phenyl, indenyl, fluorenyl, or naphthyl moiety.

The aromatic-group-containing monomer further comprises at least one polymerizable double bond such that after polymerization, the aromatic structure will be pendant from the polymer backbone. The aromatic-group containing monomer can further be substituted with one or more hydrocarbyl groups including but not limited to $C_1$ to $C_{10}$ alkyl groups. Additionally, two adjacent substitutions can be joined to form a ring structure. Advantageous aromatic-group-containing monomers contain at least one aromatic structure appended to a polymerizable olefinic moiety. Particularly advantageous aromatic monomers include styrene, alpha-methylstyrene, para-alkylstyrenes, vinyltoluenes, vinylnaphthalene, allyl benzene, and indene, especially styrene, paramethylstyrene, 4-phenyl-butene-1 and allylbenzene.

Non-aromatic cyclic group containing monomers can be used. These monomers can contain up to 30 carbon atoms. Suitable non-aromatic cyclic group containing monomers advantageously have at least one polymerizable olefinic group that is either pendant on the cyclic structure or is part of the cyclic structure. The cyclic structure can also be further substituted by one or more hydrocarbyl groups such as, but not limited to, $C_1$ to $C_{10}$ alkyl groups. Advantageous non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantad and the like.

Diolefin monomer(s) can be used. Advantageous diolefin monomers include any hydrocarbon structure, advantageously $C_4$ to $C_{30}$, having at least two unsaturated bonds, wherein at least two of the unsaturated bonds are readily incorporated into a polymer by either a stereospecific or a non-stereospecific catalyst(s). It is further advantageous that the diolefin monomers be selected from alpha-omega diene monomers (e.g., divinyl monomers). More advantageously, the diolefin monomers are linear divinyl monomers, most advantageously those containing from 4 to 30 carbon atoms. Examples of advantageous dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly advantageous dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (weight average molecular weight less than 1000 g/mol). Advantageous cyclic dienes include cyclopentadiene, vinylnorbornene, norbornadiene, ethylidene norbornene, divinylbenzene, dicyclopentadiene or higher ring containing diolefins with or without substituents at various ring positions.

Example Embodiments

A first example embodiment is a method comprising: synthesizing a polymer in a reactor under a set of parameters, wherein the reactor comprises a solution mixture having a refractive index, and wherein the solution mixture comprises a solvent, a polymer, and optionally a monomer, wherein the solution mixture has a polymer concentration; measuring the refractive index of the solution mixture; comparing the refractive index of the solution mixture with a calibration curve; and identifying the polymer concentration in the solution mixture. Optionally this method can further include one or more of the following: Element 1: further comprising modifying the set of parameters based on the polymer concentration of the solution mixture; Element 2: wherein the reactor is a loop reactor; Element 3: wherein the reactor is a stirred tank reactor; Element 4: further comprising a devolatilization step; Element 5: Element 4 and wherein the refractive index is measured before the devolatilization step; Element 6: further comprising a finishing step; and Element 7: Element 6 and wherein the refractive index is measured before the finishing step; Element 8: wherein the polymer comprises a polyolefin; Element 9: wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1,5-ethyl-nonene-1, styrene, alpha-methylstyrene, para-alkylstyrenes, vinyltoluenes, vinylnaphthalene, allyl benzene, and indene, especially styrene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene; Element 10: wherein the polymer concentration is in a range from about 1 wt % to about 75 wt %. Examples of combinations of the foregoing include, but are not limited to, Element 1 in combination with one or more of Elements 2-3 and optionally in further combination with Element 4; Element 1 in combination with Element 4 and optionally in further combination with Element 5; Element 1 in combination with Element 6 and optionally in further combination with Element 7; Element 1 in combination with one or more of Elements 8, 9 or 10; Element 1 in combination with one or more of Elements 2 and 3 and two or more of Elements 8-10.

Another example embodiment is a system comprising: a reactor containing a solution mixture comprising a solvent, a polymer, and optionally a monomer; a flash vessel fluidly coupled to the reactor to receive the solution mixture from the reactor; and a first refractometer fluidly coupled to the reactor, placed between the reactor and the flash vessel, and configured to measure a refractive index of the solution mixture. Optionally this system can further include one or more of the following: Element 2; Element 3; Element 8; Element 9; Element 10; Element 11: further comprising a devolatilization unit; Element 12: further comprising a finishing unit; Element 13: further comprising a third refractometer placed between the flash vessel and the devolatilization unit and/or between the flash vessel and the finishing unit. Examples of combinations of the foregoing include, but are not limited to, Element 1 in combination with one or more of Elements 2, 3, 8-10; Element 1 in combination with one or more of Elements 11 and 12 and optionally in further combination with Element 13; Element 1 in combination with one or more of Elements 11 and 12 and optionally in further combination with Element 13 and in further combination with one or more of Elements 2, 3, 8-10; Element 1 in combination with one or more of Elements 11 and 12 and optionally in further combination with Element 13 and in further combination with two or more of Elements 2, 3, 8-10.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While methods and systems are described herein in terms of "comprising" various components or steps, the methods and systems can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Example 1

A solution polymerization reaction was simulated with four different polymer concentrations (cases 1-4). The simulation software used was Aspen Plus version 9.0. The thermodynamic method is based on Perturbed-Chain Statistical Association Fluid Theory (PC-SAFT). The required material properties were directly obtained from the property data banks implemented in Aspen Plus. The binary interaction parameters of species in PC-SAFT were calculated based on a group contribution method.

The solvent selected in the solution polymerization reaction simulated in the example was 2-methyl pentane, which is a common solvent in solution polymerization process of polyolefins. The polymer was $C_{20}H_{42}$, which has a similar refractive index than that of polyethylene. The residual unreacted monomer was ethylene. The polymer concentration ranged from 0% to 75%.

Figure 3:
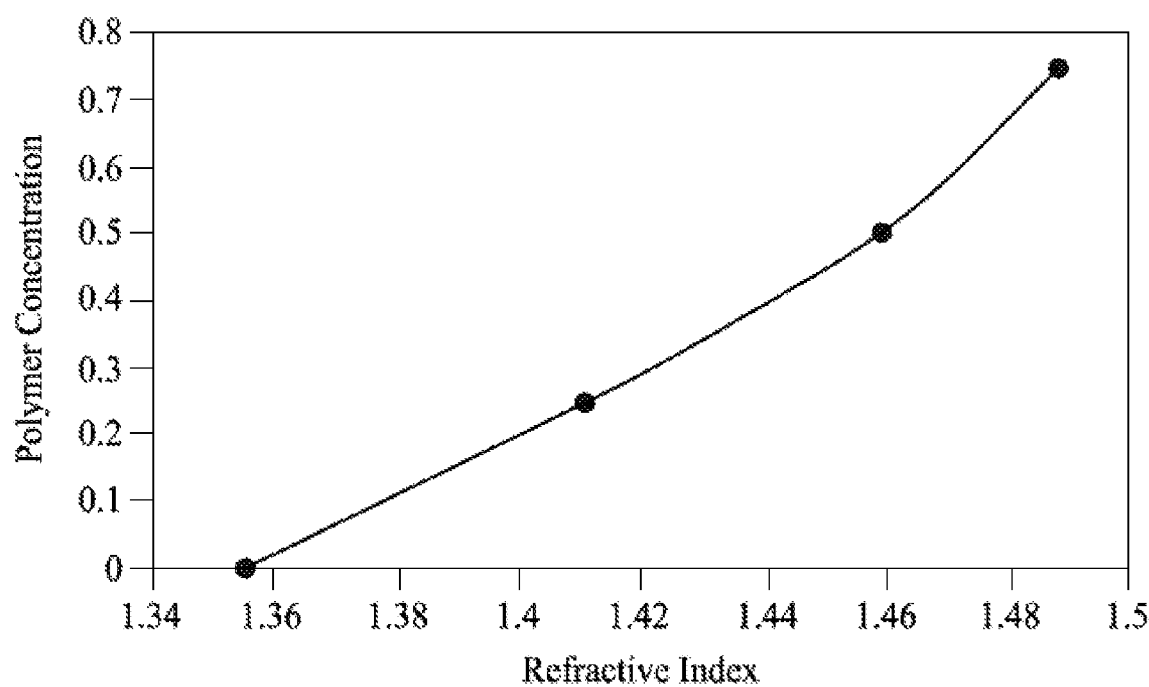
FIG. 3 is a graph showing the calculated polymer concentration as a function of the refractive index of Example 1.

The refractive index, volume flowrate, and density of the mixture fluid were calculated. FIG. 3 shows the polymer concentration as a function of the refractive index. Table 1 represent the calculated refractive index, calculated volume flowrate, and calculated density of the mixture fluid for various polymer concentrations at various weight fractions of solvent and monomer.

TABLE 1

|  |  | Case 1 | Case 2 | Case 3 | Case 4 |
|---|---|---|---|---|---|
| Solvent | wt % | 0.95 | 0.7125 | 0.475 | 0.2375 |
| Polymer | wt % | 0 | 0.25 | 0.5 | 0.75 |
| Monomer | wt % | 0.05 | 0.0375 | 0.025 | 0.0125 |
| Volume Flowrate | l/min | 0.758076 | 2.917011 | 2.795238 | 2.625815 |
| Density, mixture | mol/cc | 0.007039 | 0.005993 | 0.004873 | 0.003717 |
| Refractive index |  | 1.355313 | 1.41101 | 1.459342 | 1.488495 |

This example illustrates that the refractive index increases monotonically with the increase of polymer concentration with a good resolution. More importantly, the trend is affected by neither the total volume flowrate nor the weight fraction of non-polymer substance. Therefore, the refractive index detection is a very effective and efficient method to measure the polymer concentration in solution polymerization process.

Example 2

A polymerization reaction was carried out with varied polymerization concentrations. KALENE® 800, poly (isobutylene) produced by Royal Adhesives and Sealants (South Bend, Ind.), was used as the polymer. The polymer was dissolved in isohexane, produced by South Hampton Resources (Silsbee, Tex.), from a concentration of 2.5% to 25%. The solution remained stable at ambient temperature and pressure during the refractive index test. Abbe Refractometer Model AR-001, made by AFAB Enterprises (Eustis, Fla.), was used to measure the refractive index of the polymer solutions at room temperature.

Figure 4:
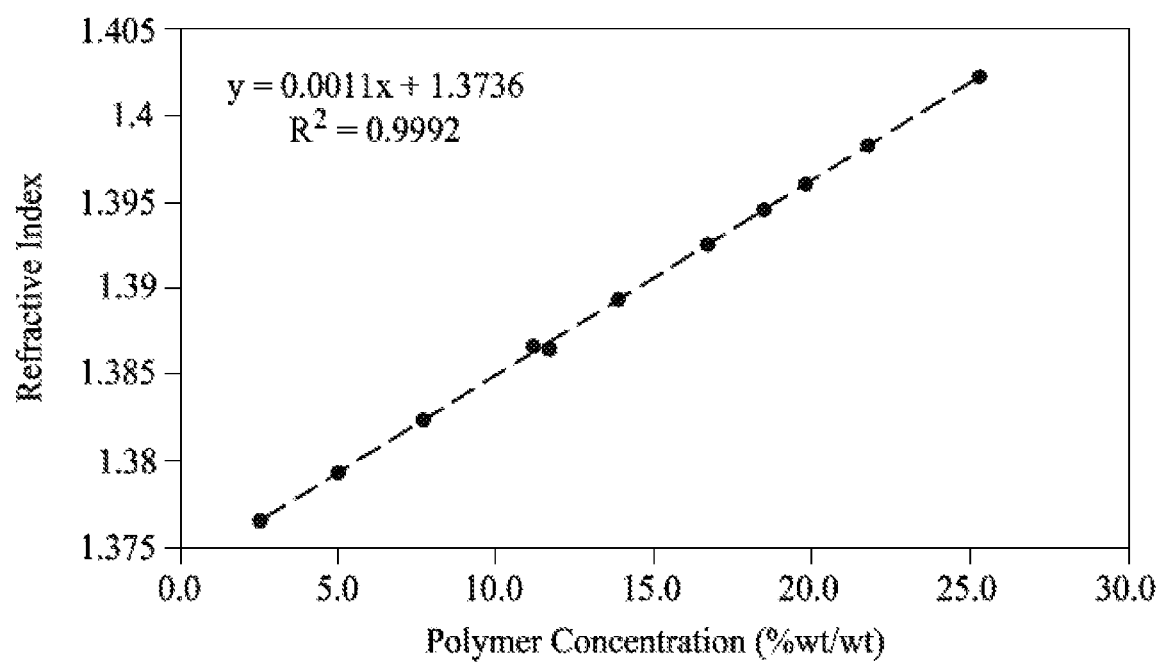
FIG. 4 is a graph showing the experimentally measured polymer concentration as a function of the refractive index of Example 2.

FIG. 4 shows the measured refractive index in function of the polymer concentration. As illustrated in FIG. 4, the polymer concentration has a linear relationship with the refractive index in a wide range between 2.5% and 25% with R squared of 0.9992 in the regression.

This example illustrates that, since the resolution of commercially available inline refractometer can be as high as 0.00001, the polymer concentration can be precisely determined by measuring the refractive index of the effluent existing in the reactor.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method, comprising:
    synthesizing a polymer in a reactor under a set of parameters, wherein the reactor comprises a solution mixture having a refractive index, wherein the solution mixture comprises a solvent, a polymer, and optionally a monomer, and wherein the solution mixture has a polymer concentration;
    measuring the refractive index of the solution mixture;
    comparing the refractive index of the solution mixture with a calibration curve; and
    identifying the polymer concentration in the solution mixture.

2. The method of claim 1, further comprising modifying the set of parameters based on the polymer concentration of the solution mixture.

3. The method of claim 1, wherein the reactor is a loop reactor.

4. The method of claim 1, wherein the reactor is a stirred tank reactor.

5. The method of claim 1, further comprising a devolatilization step.

6. The method of claim 5, wherein the refractive index is measured before the devolatilization step.

7. The method of claim 1, further comprising a finishing step.

8. The method of claim 7, wherein the refractive index is measured before the finishing step.

9. The method of claim 1, wherein the polymer comprises a polyolefin.

10. The method of claim 1, wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methyl styrene, para-alkylstyrenes, vinyltoluenes, vinylnaphthalene, indene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

11. The method of claim 1, wherein the polymer concentration is in a range from about 1 wt % to about 75 wt %.

12. A system comprising:
    a reactor containing a solution mixture comprising a solvent, a polymer, and optionally a monomer;
    a flash vessel fluidly coupled to the reactor to receive the solution mixture from the reactor; and
    a first refractometer fluidly coupled to the reactor, placed between the reactor and the flash vessel, and configured to measure a refractive index of the solution mixture.

13. The system of claim 12, wherein the reactor is a loop reactor.

14. The system of claim 12, wherein the reactor is a stirred tank reactor.

15. The system of claim 12, further comprising a devolatilization unit.

16. The system of claim 15, further comprising a finishing unit.

17. The system of claim 16, further comprising a second refractometer placed between the flash vessel and the devolatilization unit and/or between the flash vessel and the finishing unit.

18. The system of claim 12, wherein the polymer comprises a polyolefin.

19. The system of claim 12, wherein the monomer is selected from the group consisting of: ethylene, propylene, butene, pentene, hexene, heptene, octene, nonene, decene, dodecene, 4-methylpentene-1,3-methylpentene-1,3,5,5-trimethylhexene-1, 5-ethylnonene-1, styrene, alpha-methylstyrene, para-alkylstyrenes, vinyltoluenes, vinylnaphthalene, indene, paramethylstyrene, 4-phenyl-butene-1, allylbenzene, vinylcyclohexane, vinylcyclohexene, vinylnorbornene, ethylidene norbornene, cyclopentadiene, cyclopentene, cyclohexene, cyclobutene, butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, and triacontadiene.

20. The system of claim 12, wherein the polymer concentration is in a range from about 1 wt % to about 75 wt %.

* * * * *